(12) United States Patent
Scott

(10) Patent No.: US 7,020,474 B2
(45) Date of Patent: Mar. 28, 2006

(54) SYSTEM AND METHOD FOR SECURING SHORT-DISTANCE WIRELESS COMMUNICATIONS, AND APPLICATIONS THEREOF

(75) Inventor: Walter G. Scott, North Palm Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/874,794

(22) Filed: Jun. 24, 2004

(65) Prior Publication Data

US 2005/0037774 A1    Feb. 17, 2005

Related U.S. Application Data

(60) Provisional application No. 60/482,016, filed on Jun. 25, 2003.

(51) Int. Cl.
*H04Q 7/20*    (2006.01)

(52) U.S. Cl. .............. 455/456.1; 455/456.3; 455/456.6; 455/41.2; 380/247; 380/255

(58) Field of Classification Search ............ 455/456.1, 455/456.3, 456.6, 41.1, 41.2, 41.3; 380/247, 380/255, 258, 270
See application file for complete search history.

(56) References Cited

U.S. PATENT DOCUMENTS

| | | | | |
|---|---|---|---|---|
| 6,397,073 | B1* | 5/2002 | Hottinen | 455/456.5 |
| 6,459,903 | B1* | 10/2002 | Lee | 455/456.1 |
| 6,804,494 | B1* | 10/2004 | Fernandez-Corbaton et al. | 455/65 |
| 2002/0114467 | A1* | 8/2002 | Vatanen | 380/270 |
| 2002/0123325 | A1* | 9/2002 | Cooper | 455/411 |
| 2003/0048904 | A1* | 3/2003 | Wang et al. | 380/270 |
| 2003/0088772 | A1* | 5/2003 | Gehrmann et al. | 713/175 |

* cited by examiner

*Primary Examiner*—Quochien B. Vuong
*Assistant Examiner*—Minh D. Dao
(74) *Attorney, Agent, or Firm*—Sterne, Kessler, Goldstein & Fox P.L.L.C.

(57) ABSTRACT

A first portable wireless communication device enters a PICONET and establishes unencrypted communications with a second wireless communication device, the PICONET master. The first portable wireless communication device transmits identification information to the second wireless communication device using a conventional short-distance communications protocol. The second wireless communication device transmits, in a novel FEMTONET communications mode, an encryption key to the first portable wireless communication device. The first portable wireless communication device then securely transmits encrypted messages based on the encryption key to the second wireless communication device using the conventional short-distance communications protocol.

17 Claims, 5 Drawing Sheets

SYSTEM AND METHOD FOR SECURING SHORT-DISTANCE WIRELESS COMMUNICATIONS, AND APPLICATIONS THEREOF

CROSS REFERENCE TO RELATED APPLICATIONS

This application claims the benefit of U.S. Provisional Application No. 60/482,016, filed Jun. 25, 2003, entitled "System and Method for Securing Short-Distance Wireless Communications, and Applications Thereof," which is incorporated by reference herein in its entirety.

BACKGROUND OF THE INVENTION

1. Field of the Invention

The present invention relates generally to wireless communications. More particularly, it relates to securing communications with wireless devices over a short distance.

2. Background of the Invention

The Institute of Electrical and Electronics Engineers (IEEE) has promulgated standards designated 802.11 and 802.15 for short-distance wireless networks. These standards describe protocols and procedures that allow wireless devices in a Personal Operating Space (WLAN, PICONET, PAN) or IEEE Personal Area Network to communicate.

Generally speaking, a short-distance wireless device designed to operate as part of a PICONET, WLAN or PAN has a transmission radius of at least 10 meters. This is based on, for example, a short-distance wireless device having a 2.4 GHz, 1 milli-watt transmitter operating at about 1 Mb/s. Multiple short-distance wireless devices having peer-to-peer communications capabilities can operate in overlapping PICONETs or PANs to form part of a larger communications network (termed a Scatter Net).

The general trend in short-distance wireless communications has been to increase the operating range of conventional PICONETs and PANs. For example, more recent PICONET and PAN standards call for a 30-meter operating range. This increase in range is disadvantageous for short-distance wireless applications where security is important. For example, by increasing the transmission range of short-distance wireless devices in a PICONET or PAN, it becomes more difficult to limit the number of wireless devices that receive network messages, and as a result, it becomes more likely that network message will be received and either erroneously acted upon by an unintended recipient or perhaps even hacked by an unauthorized recipient. Encrypting network messages can overcome the issues associated with increased operating ranges, but using encryption makes it difficult for wireless devices to seamlessly enter and exit a conventional PICONET or PAN.

What is needed are new, more secure systems and methods for short-distance wireless communications that overcome the limitations of a conventional PICONET or PAN. Specifically what is needed is a method of exchanging session keys between a user entering the PICONET and a trusted body supervising the physical location.

BRIEF SUMMARY OF THE INVENTION

The present invention provides a system and method for secure, short-distance wireless communications. In an embodiment, the present invention provides a system that is compliant and compatible with the established conventional communication systems and adds a method whereby a proprietor of a physical space can implement, for example, a node (proprietor node) in a PICONET that can securely send session encryption keys or session keys over the PICONET to a particular portable wireless communication device. The transmission of the session key is only receivable in a small physical volume in the PICONET (approximately 1 cubic foot) which is referred to herein as a FEMTONET, which surrounds the exact physical location of the portable wireless communication device. As it is very unlikely that two portable wireless communication devices can occupy the same FEMTONET without being noticed, the present invention provides a convenient secure method of passing session keys to only one party. The session keys allow the receiving portable wireless communication device or party to encrypt its communications with the proprietor node in order to prevent other nodes in the PICONET from receiving data that may be confidential.

In an embodiment, communications are established between a first portable wireless communication device or node and the proprietor wireless communication device or node. This typically occurs, for example, when the first wireless communication device enters within the operating range of a PICONET of which the proprietor wireless communication device is the master. This may involve the first wireless communication device entering into a communications protocol (in some standards called a "Discovery Protocol") with the second wireless communication device so that the first wireless communication device can become a node of the PICONET.

The communications protocol exchange between the first and the second wireless communication devices are conducted in a PICONET communications mode. As used herein, PICONET communications mode is defined as any conventional short-distance communications mode such as, for example, WI-FI, IEEE 802.11, BLUETOOTH, or IEEE 802.15 compliant communications mode.

After communications between the first and the second (e.g., proprietor) wireless communication devices have been established, the first wireless communication device sends, in PICONET communications mode, identification information to the second wireless communication device. In an embodiment, this identification information includes a universally unique identification number associated with the first wireless communication device. The first communication device is now a node in the PICONET and able to communicate and utilize the resources provided by the other nodes of the PICONET.

In an embodiment, such as a shop or secure building, the first wireless communication device enters the PICONET at an entrance. This entrance is equipped with at least one antenna and radio frequency reflectors suitable for reflecting the RF signals from the first wireless communication device so that the location of the first wireless communication device is encrypted by the reflections to allow a transmission from the proprietor node to concentrate the in phase signal into a FEMTONET leaving the majority of the PICONET with a signal that is out of phase and that is interpreted by other wireless communication devices as a collision and ignored. This message sent to the FEMTONET is used to download to the first wireless communication device a session key for encrypting data to be sent back to the proprietor.

After receiving the session encryption key, the first wireless communication device transmits, in PICONET communications mode, encrypted information based on the encryption key to the proprietor wireless communication device. This information can only be decoded by the proprietor wireless communication device. Thus, the information transmitted by the first wireless communication device to the second wireless communication device is secure even though the information is being transmitted in PICONET communications mode.

In an embodiment of the present invention, the second wireless communication device transmits the session encryption key to the first wireless communication device via a plurality of signals that constructively interfere in the vicinity of a spatial location determined by a locator of the second wireless communication device. This spatial location corresponds to the physical location of the first wireless communication device. The signals transmitted by the second wireless communication device destructively interfere in locations about the spatial location determined by the locator.

In an embodiment, the locator of the second wireless communication device carries out a time-reversal-mirror function. This function enables the second wireless communication device to locate and track the location of the first wireless communication device.

In an embodiment, the shape of the spatial location determined by the locator of the second wireless communication device is an approximately spherical volume having a diameter of less than three feet. In another embodiment, the diameter of the approximately spherical volume is less than one foot.

In an embodiment of the present invention, the plurality of signals sent by the second wireless communication device, when operating in FEMTONET communications mode, are transmitted by a single antenna coupled to the second wireless communication device. At least one of the signals arrives at the spatial location determined by the locator after being reflected by a reflector.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

DETAILED DESCRIPTION OF THE INVENTION

Overview of the Invention

The present invention relates generally to systems and methods for short-distance wireless communications, and applications thereof. In an embodiment of the present invention, a first portable wireless communication device enters a PICONET and establishes unencrypted communications with a second wireless communication device, the PICONET master. The first portable wireless communication device transmits identification information to the second wireless communication device using a conventional short-distance communications protocol. The second wireless communication device transmits, in a novel FEMTONET communications mode, an encryption key to the first portable wireless communication device. The first portable wireless communication device then securely transmits encrypted messages based on the encryption key to the second wireless communication device using the conventional short-distance communications protocol.

Example System Embodiment of the Present Invention

Figure 1:
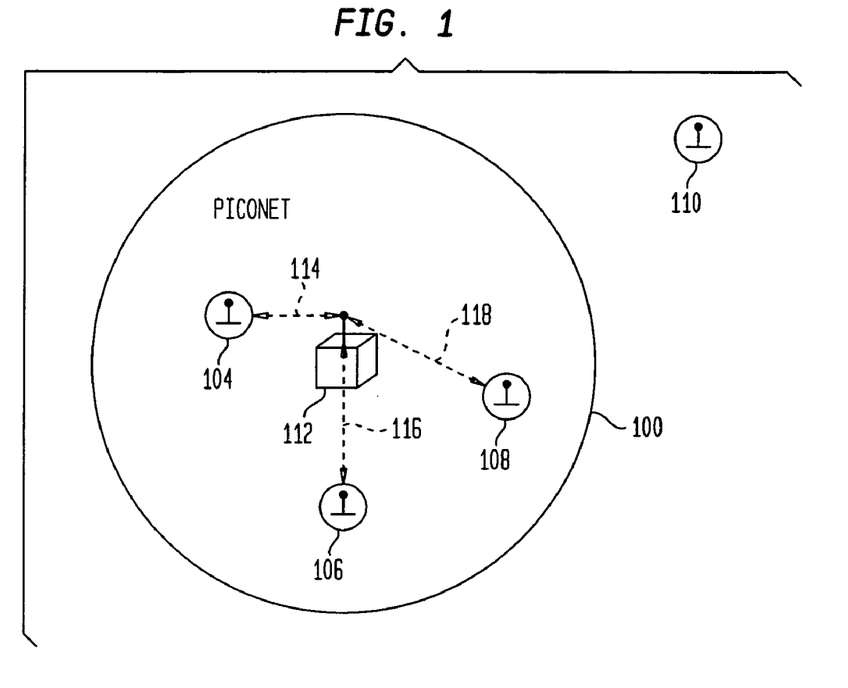
FIG. 1 is a diagram of an example PICONET.

FIG. 1 illustrates an example PICONET 100. As shown in FIG. 1, PICONET 100 includes a dual communications mode wireless communication device 102 and three wireless communication devices 104, 106, and 108. Wireless communication device 102 is the master of PICONET 100. The three wireless communication devices 104, 106, and 108 are slaves that adopt the timing of wireless communication device 102 and respond to any messages from wireless communication device 102. The outer edge of PICONET 100 shown in FIG. 1 represents the maximum effective transmission range of wireless communication device 102. A fourth wireless communication device 110 shown in FIG. 1 is not yet a part of PICONET 100.

As described in more detail below, wireless communication device 102 is capable of communicating with any wireless communication device in PICONET 100 in a PICONET communications mode or a FEMTONET communications mode. As noted above, PICONET communications mode is defined as any conventional short-distance communications mode such as, for example, a Wi-Fi, a BLUETOOTH compliant communications mode or an IEEE 82.11, or an IEEE 802.15 compliant communications mode. FEMTONET communications mode is defined as a novel short-distance communications mode wherein communications signals intended for reception by a particular wireless communication device of PICONET 100 are sent by wireless communication device 102 in a manner that precludes other wireless communication devices within the transmission range of wireless communication device 102 from receiving or intercepting the signals. In an embodiment, when operating in FEMTONET communications mode, the signals sent by wireless communication device 102 constructively interfere in the vicinity of a wireless communication device selected by wireless communication device 102 to receive the signals and ideally destructively interfere in every other location in PICONET 100. Because the signals sent by wireless communication device 102, when operating in FEMTONET communications mode, destructively interfere in every location of PICONET 100 except in the vicinity of the intended recipient wireless communication device, other wireless communication devices of PICONET 100 are precluded from receiving or intercepting the signals.

As illustrated in FIG. 1, each of the wireless communication devices 104, 106, and 108 are in communications with wireless communication device 102. Wireless communication device 104 communicates with dual communications mode wireless communication device 102 via a communications channel 114. Wireless communication device 106 communicates with dual communications mode wireless communication device 102 via a communications channel 116. Wireless communication device 108 communicates with dual communications mode wireless communication device 102 via a communications channel 118. Although not shown, additional communications channels can exist between the various wireless communication devices that makeup PICONET 100.

Each of the three communications channels 114, 116, and 118 can be any standard short-distance communications channel such as, for example, a BLUETOOTH compliant communications channel or an IEEE 802.11 compliant communications channel, and/or a FEMTONET communications channel according to the present invention. As will be understood by persons skilled in the relevant arts given the description herein, the three communications channels 114, 116, and 118 can be implemented by a single, omni-directional broadcast by wireless communication device 102, when operating in a PICONET communications mode. When wireless communication device 102 is operating in FEMTONET communications mode, only one of the three communications channels 114, 116, and 118 can be active at any given time. As explained in more detail below, in an embodiment, the three communications channels 114, 116, and 118 carry encrypted messages.

Figure 2:
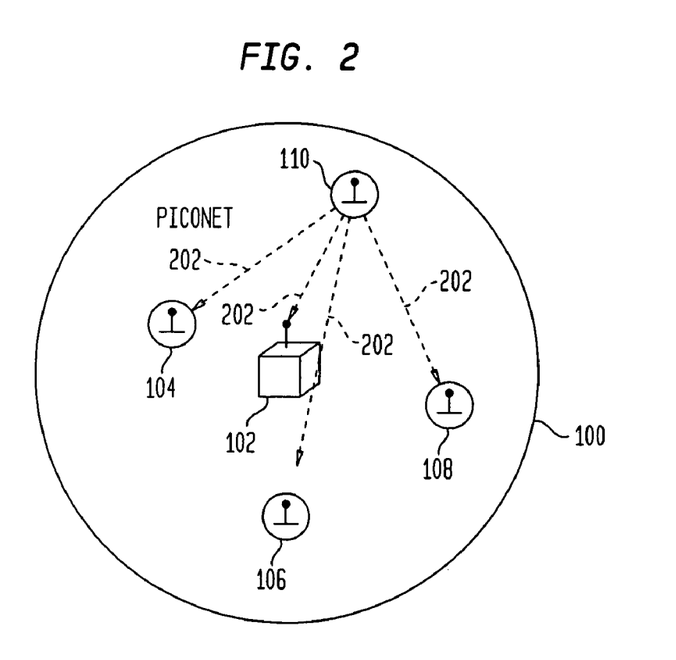
FIG. 2 is a diagram illustrating a wireless communication device attempting to enter the PICONET of FIG. 1.

FIG. 2 is a diagram illustrating wireless communication device 110 attempting to enter PICONET 100. As shown in FIG. 2, wireless communication device 110 is within the transmission range of wireless communication device 102.

In order to enter PICONET 100, wireless communication device 110 transmits a signal 202 indicating its presence and its desire to become a communications node of PICONET 100. The signal 202 is capable of being received by wireless communication devices 102, 104, and 108. As shown in FIG. 2, wireless communication device 106 is beyond the maximum effective transmission range of wireless communication device 110.

As will be understood by persons skilled in the relevant art given the description herein, it is desirable in many applications that the communications established between two or more of the wireless communication devices in PICONET 100 such as, for example, wireless communication device 102 and wireless communication device 110 be secure. This security can be achieved if an encryption key is used to encrypt messages before they are transmitted. The problem that arises, however, when wireless communication device 110 tries to enter PICONET 100 is how can an encryption key be passed between wireless communication device 102 and wireless communication device 110 without the encryption key being intercepted by another wireless device present within the transmission range of either wireless communication device 102 or wireless communication device 110. How this can be accomplished is described in detail below with reference to FIGS. 4 through 6.

Figure 3:
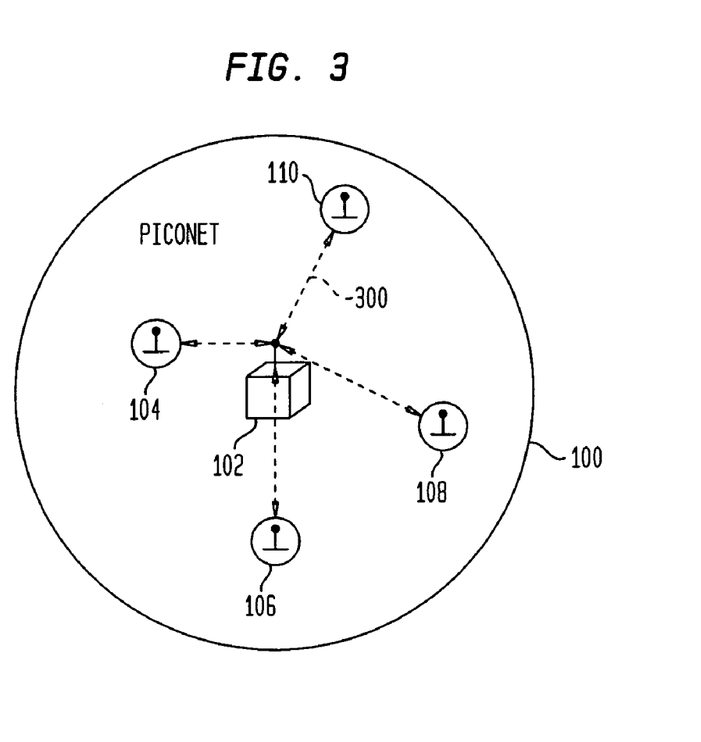
FIG. 3 is a diagram illustrating the PICONET of FIG. 1 after it has been expanded to include an additional wireless communication device.

FIG. 3 is a diagram illustrating PICONET 100 after wireless communication device 110 has successfully entered PICONET 100. As shown in FIG. 3, a secure communications channel 300 has been established between wireless communication device 102 and wireless communication device 110.

Wireless communication device 110 encrypts messages to be sent to wireless communication device 102 with an encryption key received from wireless communication device 102. As noted above, how this encryption key is securely passed to wireless communication device 110 is described in detail below with reference to FIGS. 4, 5, and 6. In an embodiment, messages received by wireless communication device 110 from wireless communication device 102 are also encrypted. These messages can be encrypted with an encryption key provided by wireless communication device 102 or with an encryption key provided by wireless communication device 110. Once wireless communication device 110 has received an encryption key from wireless communication device 102, wireless communication device 110 can send, in PICONET communications mode, an encryption key (encrypted using the encryption key received from wireless communication device 102) to wireless communication device 102. Because only wireless communication devices 102 and 110 know the encryption key(s) used to encode messages passed via communications channel 300, other wireless communication devices within the transmission ranges of wireless communication devices 102 and 110 cannot decode these messages.

Figure 4:
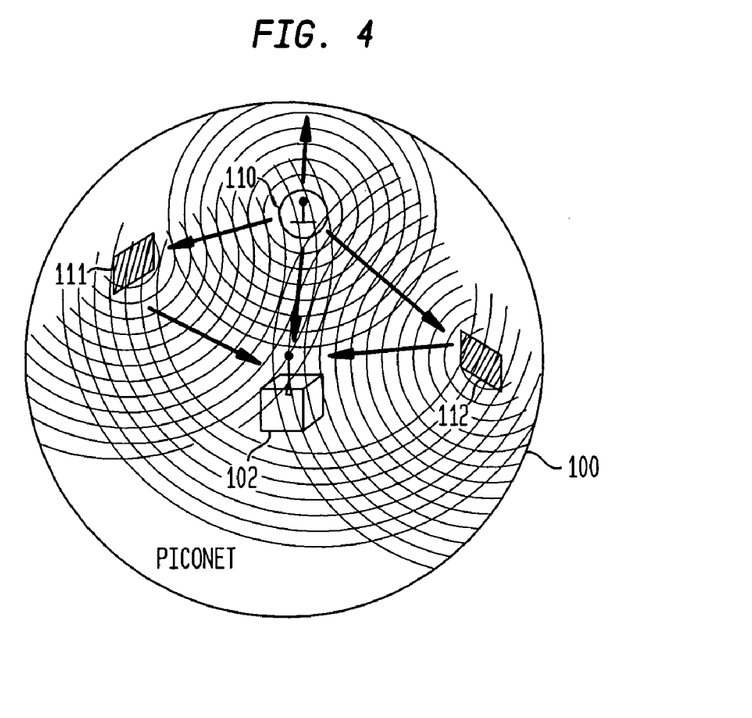
FIG. 4 is a diagram illustrating the use of radiofrequency (RF) reflectors for securing short-distance wireless communications.

FIG. 4 illustrates a mobile communication device 110 transmitting its discovery protocol packages in example PICONET 100 in which radio frequency (RF) reflectors are used in accordance with teachings of the present invention. In this example embodiment of the present invention, there are several RF reflectors such as RF reflectors 111 and 112, which may be existing structures such as walls, or which may be deliberately engineered and placed to enhance RF reflections.

The signal transmitted by communication device 110 has several paths to the wireless communication device 102 (proprietor node). These paths are, for example, either direct or via the RF reflectors 111 and 112. The signal received at the wireless communication device 102 is the sum of, in this case, the signal directly from communication device 110 and the reflections from the passive RF reflections 111 and 112. This summed received signal may be considered to have some properties or signature of the environment of the PICONET 100. If the reflection devices such as RF reflectors 111 and 112 are not extensively large, as defined by the percentage of the subtended solid angle to the wireless communication device 110, the direct signal will be larger and the communication can be correctly interpreted. The reflected signals would normally be treated as background noise.

However, provided that the RF reflectors 111 and 112 are large with respect to the wavelength (50–100 cm in any direction) the reflections would contain a signal that is coherent with the direct signal and delayed with respect to the direct signal. In the case of PICONETs based on, for example, the above referred to IEEE 802.11 and IEEE 802.15 standards and the proposed enhancements to those standards, where the wavelengths are 12 cm and 6 cm respectively for 2.4 GHz and 5 GHZ, it is only necessary to retransmit from wireless communication device 102 any message with three similarly delayed signals to make the transmission appear generally across PICONET 100 as badly corrupted data except at the location of wireless communication device 110. At the location of wireless communication device 110, the signal received by wireless communication device 110 directly from wireless communication device 102 will be received in phase with the signal reflections from RF reflectors 111 and 112. This in-phase summation by the reflectors (environment) will allow wireless communication device 110 to extract the original sent message.

As will be understood by persons skilled in the relevant arts given the description herein, the invention is not limited to the embodiment shown in FIG. 4. FIG. 4 illustrates two RF reflections and a direct signal being received by wireless communication device 102. In a more complex embodiment, there will be many reflections from the environment and the signal transmitted from wireless communication device 102 to the mobile wireless communication device 110 will be a complex sum of all these reflections. This is accomplished by a technique commonly known as a time reversal mirror where the received summed signal from wireless communication device 110 at wireless communication device 102 is stored and later retrieved in reverse order for encryption of the signals sent from wireless communication device 102 to wireless communication device 110. In many instances, the direct signal will be subtracted from the time reversal mirror and not sent out from wireless communication device 102 so that only the signals that are reflected will arrive at wireless communication device 110 in phase via the RF reflectors.

Figure 5A:
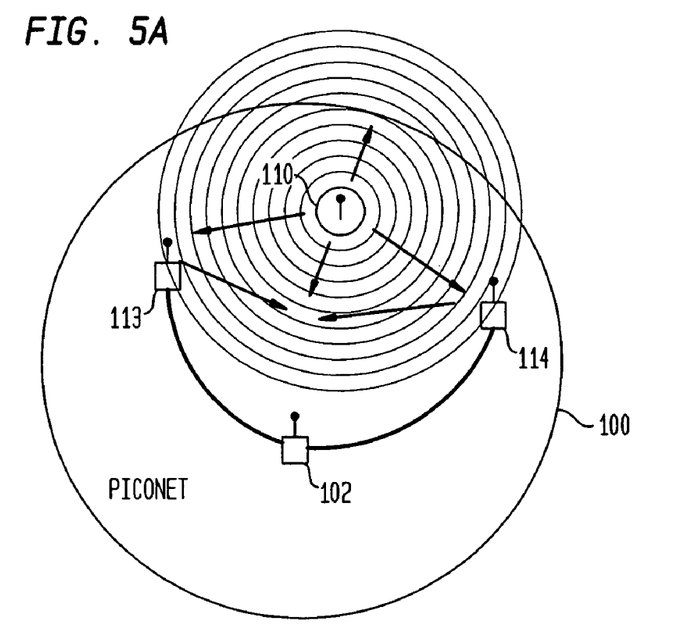
FIG. 5A is diagram illustrating the use of multiple antennas for securing short-distance wireless communications.
Figure 5B:
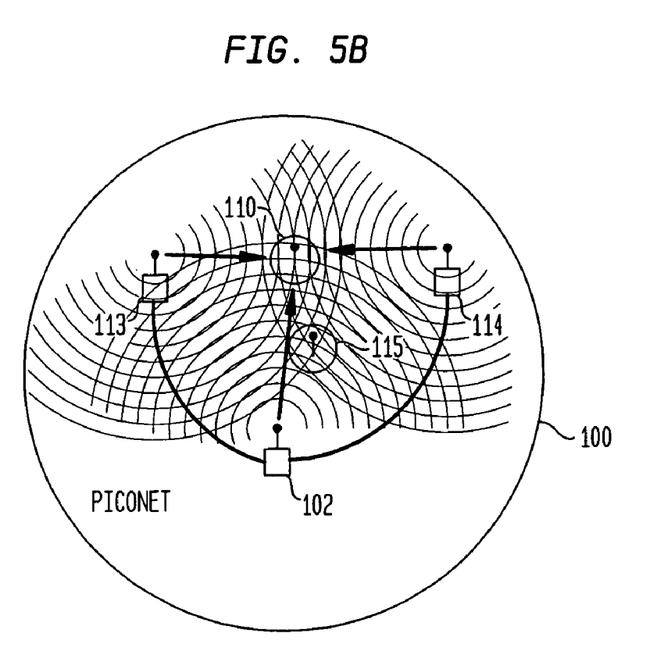
FIG. 5B is a diagram illustrating an example of secure short-distance wireless communications.

FIG. 5A illustrates another example embodiment of the present invention. In this example embodiment, there are a plurality of antennas such as, for example, antennas 113 and 114 all connected to wireless communication device 102. If the received signals from these antennas are summed, the location of any transmitting device in PICONET 100 will be encoded into the summed signal. The delayed coherent signals will include the delays of signal travel in the coaxial or the electrical cables that connect wireless communication device 102 to the antennas. These compound delays, which can also be referred to as phase differences, will be reversed in the time reversal mirror and consequently automatically accounted for in the properties of the time reversal mirror. Wireless communication device 102 can then multiply its communications into the time reversal mirror for transmitting over the plurality of antennas. In this manner, it is with a high degree of probability that the only place in PICONET 100 that will receive an uncorrupted signal (e.g., in-phase signal as illustrated by FIG. 5B) is the original transmitter in PICONET 100 or wireless communication device 110. FIG. 5B illustrates that wireless communication device 110 is in an in-phase space or location while wireless communication device 115 is in an out-of-phase location.

In some embodiments such as a shop or office, for example, the entrance can be enhanced with reflectors and/or antennas to facilitate a log in procedure where the mobile wireless communication device entering the facility passes up its UUID and performs its Discovery Protocol with the facility and the facility downloads the session key to the mobile communication device for that visit or attendance. Such a special construction at the entrance ensures optimal isolated reception in a specifically designed FEMTONET space. As noted herein, a FEMTONET is a volume that is a small fraction of a PICONET and in embodiments is on the order of a one thousandth of the volume of the PICONET.

The technique described herein is designed to send via multiple paths radio frequency energy that arrives at the FEMTONET in-phase and is thus additive and produces a strong signal. It is, however, possible although unlikely that other nodes or FEMTONETs in the total irradiated volume of the PICONET could receive the multiple path radio frequency energy in-phase or in sufficient phase to be interpretable. These in-phase FEMTONETs in general would be random and made even less likely to occur with a suitably complex antenna and/or reflector arrangement.

Example Method Embodiment of the Present Invention

Figure 6:
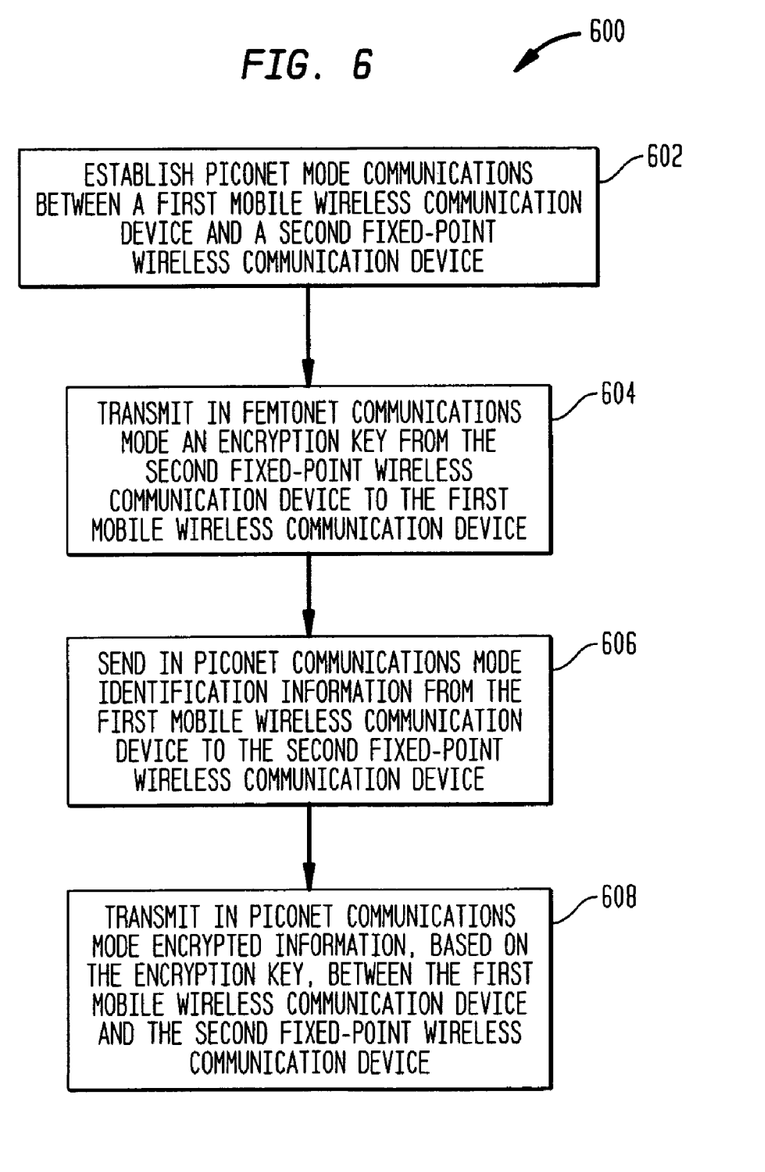
FIG. 6 is a flowchart illustrating the steps of a method for establishing secure short-distance communications.

FIG. 6 is a flowchart illustrating the steps of a method 600 for establishing secure short-distance communications. As illustrated in FIG. 6, method 600 includes four steps 602, 604, 606, and 608.

In step 602, communications are established between a first mobile wireless communication device and a second fixed-point wireless communication device. This step is performed, for example, when a wireless communication device enters within the operating range of a PICONET master communication device. Step 602 typically involves the mobile wireless communication device entering into a communications protocol with A facilities wireless communication device (the PICONET master) so that it can become a node of the PICONET. This communications protocol is conducted in PICONET communications mode.

In step 604, the fixed-point wireless communication device transmits, in FEMTONET communications mode, a session encryption key to the mobile wireless communication device. As described herein, in embodiments, the facilities wireless communications are equipped with RF reflectors and/or antennas, and time reversal electronics. This then enables the fixed-point wireless communication device to communicate in FEMTONET mode with selected mobile wireless communication devices and supply these devices with encryption keys for encrypted communication sessions. As described herein, in FEMTONET communications mode, only the wireless communication device intended to receive a transmitted message (e.g., an encryption key) is capable of receiving the message. Wireless communication devices in the PICONET that are not the intended recipients of the message hear only noise such as, for example, out-of-phase noise that cannot be interpreted at their spatial location.

In step 606, the mobile wireless communication device now sends, in PICONET communications mode (session key encrypted communications), identification information to the facilities or fixed-point wireless communication device. In an embodiment, this identification information includes biological information from an individual possessing the mobile wireless communication device. This biological information can include, for example, print ridge pattern information from a finger or a thumb of the individual possessing the mobile wireless communication device.

In step 608, the mobile wireless communication device and the fixed-point communication device send and receive, in PICONET communications mode, encrypted information based on the encryption key. Thus, the transmitted information is secure even though the information is being transmitted in PICONET communications mode. In an embodiment of the present invention, only the information sent by the mobile wireless communication device is encrypted and the general or non-confidential information sent by the fixed-point wireless communication device is not encrypted because there is no need to encrypt the information. In still another embodiment, the mobile wireless communication device only encrypts selected, confidential information transmitted to the fixed-point wireless communication device.

Example Application of the Present Invention

Figure 7:
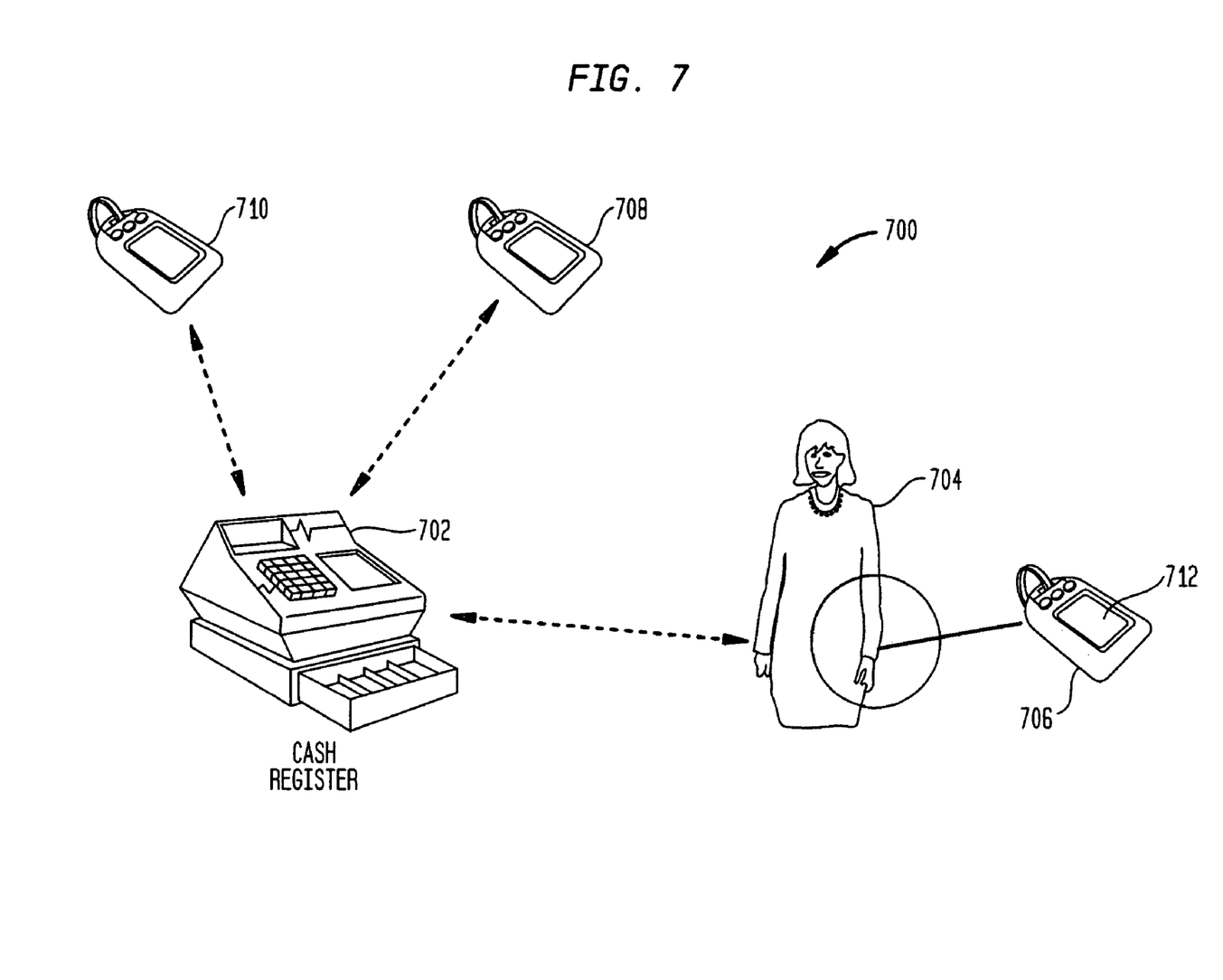
FIG. 7 is a diagram illustrating an example application of the method of FIG. 6.

FIG. 7 is a diagram illustrating an example application 700 of method 600. Application 700 involves a customer 704 wanting to make a secure electronic purchase from a merchant (not shown).

Application 700 starts with customer 704 walking towards a cash register 702 to purchase a selected good. Customer 704 is carrying a portable wireless communication device 706 that permits customer 704 to purchase the selected good electronically. See, for example, commonly owned U.S. patent application Ser. No. 10/284,453, filed Oct. 31, 2002, which is incorporated herein by reference in its entirety, for a detailed description of how to conduct a secure electronic sales transaction using a portable wireless device such as portable wireless communication device 706.

Cash register 702 is the master of a PICONET. As the customer 704 carrying the portable wireless communication device 706 approaches cash register 702, the portable wireless communication device 706 enters within the PICONET of cash register 702. After the portable wireless communication device 706 enters the PICONET of cash register 702, the portable wireless communication device 706 and the cash register 702 engage in a discovery protocol so that portable wireless communication device 706 can become a node of the PICONET.

Cash register 702 includes a plurality of antennas or is in a location with multiple RF reflectors (not shown) that enables it to time reverse the location of portable wireless communication device 706. In an embodiment, the locator carries out a time-reversal-mirror function to determine the location of portable wireless communication device 706. Cash register 702 continually updates the location of portable wireless communication device 706 as customer 704 moves about. In an embodiment, the locator determines an approximately spherical volume of space in which portable wireless communication device 706. The diameter of this approximately spherical volume of space is less than three feet. In one embodiment, the diameter of this approximately spherical volume of space is less than one foot.

In one embodiment, after the discovery protocol is complete, customer 704 is prompted by portable wireless communication device 706 to place a thumb on a sensor 712 of portable wireless communication device 706. Portable wireless communication device 706 then captures customer's thumb print ridge pattern and transmits it along with a universally unique identification number associated with portable wireless communication device 706. Other identification data can also be sent at this time. In an embodiment, this identification information is encrypted prior to being sent, for example, in the manner described below.

Upon receipt of the identification information transmitted by portable wireless communication device 706, cash register 702 switches its mode of communications from PICONET communications mode to FEMTONET communications mode. Cash register 702 then send an encryption key to portable wireless communication device 706. Because the encryption key is transmitted in FEMTONET communication mode to the small spherical volume of space containing portable wireless communication device 706, the encryption key cannot be intercepted by other wireless devices in the PICONET such as, for example, portable wireless communication devices 708 and 710. Passing the encryption key to portable wireless communication device 706 in this manner allows portable wireless communication device 706 to be easily and securely added to the PICONET of cash register 702.

Once portable wireless communication device 706 has received the encryption key from cash register 702, portable wireless communication device 706 is able to send and receive, in PICONET communications mode, encrypted messages based on the encryption key to cash register 702. The message secure message can include, for example, credit card numbers, debit card number, bank account numbers, et cetera.

As will be understood by persons skilled in the relevant arts, example application 700 is not intended to limit the present invention, but is intended to illustrate the power and usefulness of the present invention.

For the purpose of brevity and clarity, a "locator" as used herein can comprise a plurality of antennas and/or RF reflectors, either of deliberate construction or occurring naturally in the environment, and an electronic or mechanical means of performing time reversal. Electronic and mechanical means for performing time reversal will be known to persons skilled in the relevant arts given the description herein, and thus need not be described.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for short-distance wireless communications within a communication space, comprising:
   a first wireless communication device having a locator; and
   a second wireless communication device that communicates with the first wireless communication device,
   wherein the locator of the first wireless communication device analyzes first signals received via a plurality of radio frequency paths from the second wireless communication device to determine a spatial location within the communication space for the second wireless communication device, and
   wherein the first wireless communication device transmits a key by second signals that arrive via a plurality of radio frequency paths substantially in-phase at the spatial location determined by the locator and substantially out-of-phase at other locations within the communication space, thereby allowing the key to be received by the second wireless communication device.

2. The system of claim 1, wherein the shape of the spatial location determined by the locator is an approximately spherical volume.

3. The system of claim 2, wherein the approximately spherical volume has a diameter of less than three feet.

4. The system of claim 2, wherein the approximately spherical volume has a diameter of less than one foot.

5. The system of claim 1, wherein the second signals are transmitted by a single antenna coupled to the first wireless communication device and at least one of the signals arrives at the spatial location determined by the locator after being reflected by at least one reflector.

6. The system of claim 1, wherein the second signals are transmitted by a plurality of antennas coupled to the first wireless communication device.

7. The system of claim 1, wherein the second signals are transmitted using a cavity resonator.

8. The system of claim 1, wherein the locator carries out a time-reversal-mirror function.

9. The system of claim 1, wherein the first wireless communication device is a cash register and the second wireless communication device is a portable device that can capture a print ridge pattern.

10. The system of claim 1, wherein the key comprises an encryption key for encrypting data transmitted by the second wireless communication device.

11. A method for establishing secure short-distance communications, comprising:
 (a) establishing unencrypted PICONET mode communications between a first wireless communication device and a second wireless communication device;
 (b) transmitting in FEMTONET communications mode an encryption key from the first wireless communication device to the second wireless communication device; and
 (c) transmitting in PICONET communications mode an encrypted message based on the encryption key from the second wireless communication device to the first wireless communication device.

12. The method of claim 11, further comprising:
 (d) transmitting in PICONET communications mode identification information from the second wireless communication device to the first wireless communication device.

13. The method of claim 12, wherein step (d) comprises: transmitting biological information from an individual possessing the second wireless communication device.

14. The method of claim 12, wherein step (d) comprises: transmitting a universally unique identification number associated with the second wireless communication device.

15. The method of claim 12, wherein step (d) comprises: encrypting the identification information using the encryption key before it is transmitted.

16. A system for short-distance wireless communications, comprising:
 a first wireless communication device that selectively operates in one of a PICONET communications mode and a FEMTONET communications mode; and
 a second wireless communication device that communicates with the first wireless communication device in PICONET communications mode,
 wherein the first wireless communication device transmits in FEMTONET communications mode an encryption key to the second wireless communication device, thereby enabling the second wireless communication device to send in PICONET communications mode encrypted messages based on the encryption key to the first wireless communication device.

17. The system of claim 16, wherein the first wireless communication device is a cash register and the second wireless communication device is a portable device that can capture a print ridge pattern.

* * * * *